United States Patent Office 2,951,954
Patented Sept. 6, 1960

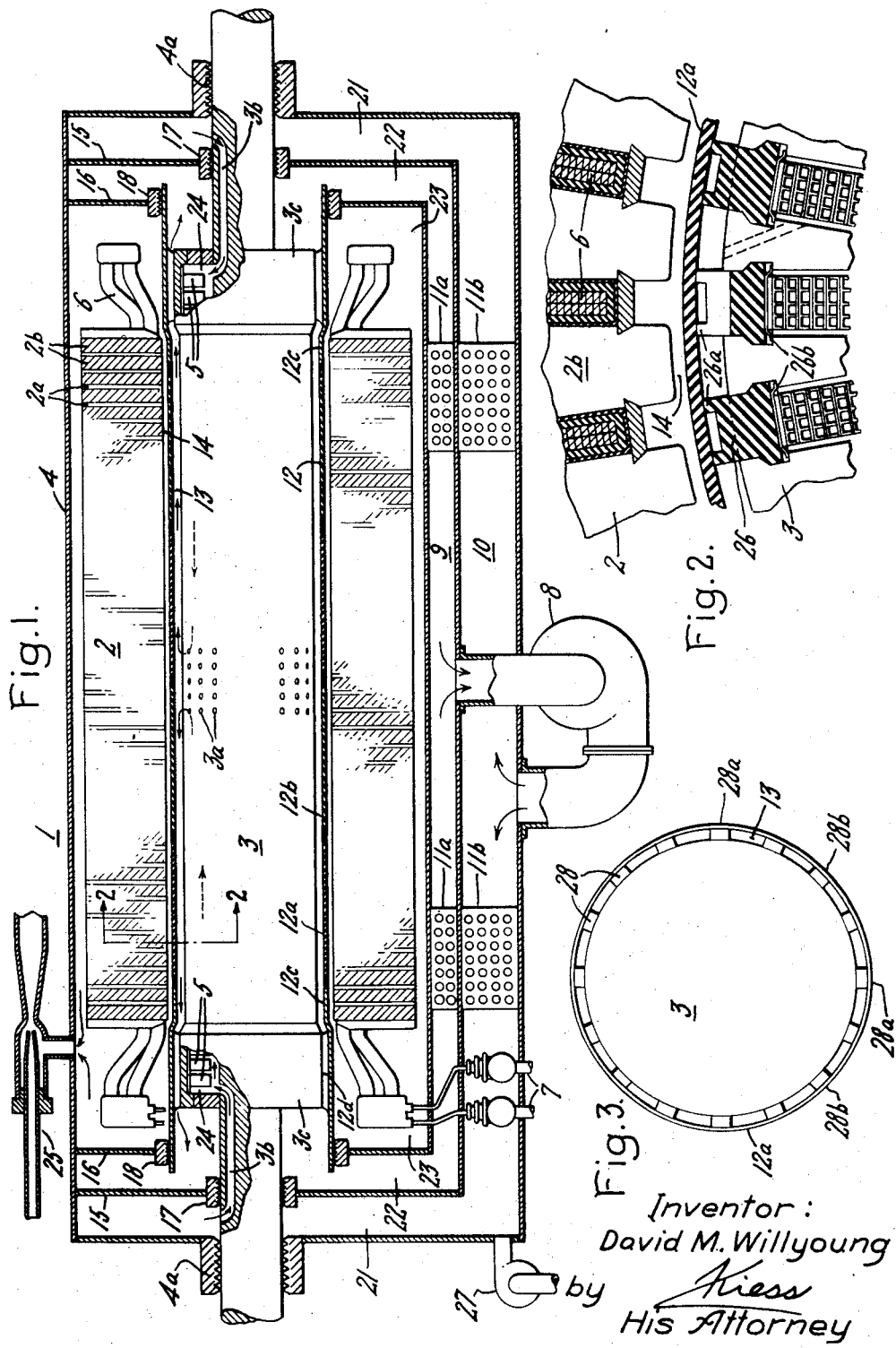

2,951,954

FLUID-COUPLED ROTOR FOR DYNAMO-
ELECTRIC MACHINE

David M. Willyoung, Scotia, N.Y., assignor to General
Electric Company, a corporation of New York Filed Feb. 12, 1959, Ser. No. 792,737

10 Claims. (Cl. 310—61)

This invention relates to a fluid-cooled rotor for a dynamoelectric machine and more particularly to an improved structure for utilizing pressurized gas for cooling the rotor while keeping the windage loss between the rotor and stator to a minimum.

One method which has been used to increase the output of a large generator has been to increase the excitation magnetomotive force of the rotating field by increasing the current supplied to the rotating field windings carried by the rotor. This results in corresponding increases in the stator winding currents and higher electrical output. One of the factors limiting the amount of current that can be circulated through the windings, of course, is the temperature rise resulting from the heating losses due to conductor resistance.

Various constructions have heretofore been utilized to cool the rotor windings. Customarily, cooling gas has been circulated through the rotor, either in direct contact with the conductors or in passages outside the main electrical insulation of the winding. This gas, after absorbing the heat from the rotor winding, has been discharged into the space between the rotor and stator, commonly called the "air gap." Often the same supply of gas has been used to cool the stator core, and in some cases the armature winding as well.

In order to prevent excessive accumulations of dirt within the generator, it has been usual to enclose the generator stator and rotor in a casing and to recirculate the cooling gas continuously through the cooling circuits and then through heat exchangers mounted inside the casing which serve to carry away the heat which the gas has absorbed from the active parts. This gas circulation has been accomplished by means of fans attached to the rotor shaft augmented by the centrifugal pumping action of the rotor itself. In some cases, the rotor-mounted fans have been replaced by separately mounted blowers.

In order to reduce the fan pressure and power required to circulate the cooling gas, and at the same time provide a more uniform distribution of temperature in the active parts, one approach has been to provide a multiplicity of variously arranged radial cooling ducts in both the stator core and rotor in order to supply and discharge cooling gas into the air gap space. This acts to shorten the effective lengths of the longitudinal internal cooling ducts and thus reduce the pressure drops across them. One such method for cooling the rotor winding and stator core is disclosed in Patent 2,702,870, issued to Rollin H. Norris on February 22, 1955, and assigned to the same assignee as the present application. The armature windings themselves of such a machine may be cooled by circulating liquid through hollow strands or by other means.

For large, high efficiency generators, it has been customary to use a gas of low density, such as hydrogen, as the cooling medium which is circulated inside the gas-tight casing. This reduces the windage losses between the stator and the rotor as well as reducing the power required to circulate the requisite amount of cooling gas through the flow circuits provided in the machine. This low density gas is frequently pressurized to three or more atmospheres, since this increases the thermal capacity per unit volume of gas which is circulated and thus allows either lower volumes of gas to be circulated or larger losses to be removed for the same gas flow within the same temperature limits. Because lower gas volumes are required, it can be shown that both the blower differential pressure and the power required to circulate sufficient coolant to remove a specified amount of loss decrease as the casing absolute pressure is increased. Increasing the casing pressure, however, increases the windage losses proportionately and serves to nullify the advantages of using a low density gas.

Thus as higher and higher currents are used in the rotor windings in order to obtain higher ratings, higher gas pressures in the casing tend to be used in order to avoid excessive blower differential pressures required to force the coolant through its prescribed cooling circuits, and to keep the associated blower power within reasonable limits. But, as this is done, windage losses increase proportionately, lowering the generator efficiency and putting an economic ceiling on how far it is reasonable to "up-rate" a machine by using higher casing pressure.

High casing pressures are undesirable for other reasons as well. The casing must be strong enough to contain these pressures, thus increasing its weight. The rotating shaft seals as well as the frame joints, are more difficult to seal to prevent leakage. The cost of the gas may be appreciable. Finally, the large quantity of gas stored in the casing represents a potential safety hazard in the event that the casing is suddenly ruptured.

Accordingly, one object of the present invention is to provide an improved structure for employing a high pressure cooling gas for cooling the rotor while minimizing windage losses.

Another object is to provide an improved rotor for a dynamoelectric machine which utilizes a rotor-enclosing cooling flow duct which rotates with the rotor to prevent discharge of the cooling fluid into the gap between the rotating and stationary portions of the dynamoelectric machine.

A still further object is to increase the output of a large generator by providing for improved rotor cooling without corresponding losses due to pumping the coolant.

Generally stated, the invention is practiced by providing a cylinder enclosing the magnetic steel rotor body which is rigidly attached to rotate with the rotor body. Passageways are thus provided for pressurized cooling gas to flow between the interior of the cylinder and the exterior of the rotor body and by utilizing rotating seals, the "clearance gap" may be maintained at a much lower pressure than the rotor coolant passages.

The subject matter of the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

Fig. 1 is an elevation drawing in section of a large gas-cooled generator utilizing my invention;

Fig. 2 is a view taken along the lines 2—2 of Fig. 1; and

Fig. 3 is an alternate method of attaching the cylinder to the rotor.

Referring to Fig. 1, a generator, shown generally at 1, comprises a stator core 2 and a rotor 3 enclosed by a pressure-tight casing 4 which is sealed with the rotor spindle by rotating seals 4a. Rotor 3 is provided with axial slots to carry field windings in the conventional manner. Rotor 3 has been cut away to show a portion of the field winding end turns 5. The field winding conductors are provided with internal ducts or conduits which conduct the flow of cooling gas axially along the rotor to cool the conductors as shown by the dotted arrows and the cooling gas then discharges radially from the rotor through openings 3a which are provided on the rotor surface for this purpose. The number and arrangement of the internal passageways in the direct-cooled conductors are not material to the disclosure of the present invention.

The stator core 2 is cooled, for example, by liquid-cooled pads 2a sandwiched between packages of active core iron 2b. The stator windings 6 consist of direct-cooled conductor bars with internal conduits which conduct cooling liquid through the windings and which are connected to external heat exchangers, filters, etc., by conduits 7. The operation of this stator winding and core cooling system is likewise not material to an understanding of the present invention. It may be noted, however, that liquid-cooled stator conductors as shown in Fig. 1 are disclosed more particularly in the patent to C.E. Kilbourne, 2,695,368, issued November 23, 1954, and assigned to the same assignee as the present application.

In order to circulate the cooling gas through the rotor, a blower 8 receives the cooling fluid from both ends of the generator by means of the duct 9 and discharges the fluid into a similar longitudinal duct 10 so that it flows toward opposite ends of the generator. Heat exchangers 11a, 11b, which are disposed in ducts 9 and 10 respectively transverse to the flow path, remove heat from the cooling fluid. Although many arrangements might be used and, in some cases, the coolers and the blower might be located externally to the generator casing, in the embodiment shown, they are incorporated into the generator casing. Note that heat exchangers 11a, 11b serve to cool the fluid both before and after it enters the blower 8, thereby affording increased opportunity to remove heat from the fluid.

Rigidly attached to rotor 3 so as to rotate with the rotor is a cylindrical member 12 which is made up of intermediate cylindrical sections 12a, 12b, etc., and end sections 12c. Member 12 is held coaxially with respect to rotor 3 and retaining rings 3c so as to provide an annular flow duct 13 between cylinder 12 and the outer surface of rotor 3. Since the cylindrical member 12 rotates with rotor 3, there must also be an annular clearance space or "clearance gap" 14 between the stator core 2 and the cylindrical member 12. Clearance gap 14 represents what would normally be referred to as the "air gap" between rotor and stator.

Radial partitions 15, 16 which are equipped with rotating seals 17, 18 respectively are located at opposite ends of the generator in order to form three separate compartments 21, 22 and 23 between the outer casing wall 4 and the stator core 2. The cooling fluid is fed from compartments 21 at each end of the generator through special conduits 3b cut in the rotor spindle portion to the cavity 24 containing the end turns 5, whence it flows axially through the direct-cooled conductor internal conduits to exit from the rotor body by way of outlet holes 3a.

Compartment 23, comprising a major part of the volume of the machine, communicates with the gap 14 between the cylindrical member 12 and the stator core 2. This space may contain a suitable gas at low pressure in order to obtain low windage loss between member 12 and the core 2. Depending on the gas utilized, this pressure might be atmospheric and compartment 23 merely vented to the atmosphere. In the embodiment shown here, however, the gas is assumed to be air, and compartment 23 and gap 14 are evacuated by means of a steam ejector 25 mounted atop generator casing 4. It will be appreciated that in the case of a steam turbine-generator, steam will be readily available to operate ejector 25 and the scavenged air from compartment 23 may be ejected directly to the atmosphere. Any air which has been ejected from the pressurized portion of the system due to leakage past rotating seals 17, 18, may be replaced by makeup pump 27. In the case of other cooling fluids, where ejection to the atmosphere would either be wasteful or harmful, suitable vacuum pump and return conduits may be utilized in a closed cycle to return the cooling fluid to the system, in lieu of ejector 25 and makeup pump 27.

Several methods may be used to attach cylindrical member 12 to the rotor 3 coaxially so as to provide axial cooling ducts between the cylindrical member and the rotor. One such method may be seen by reference to Fig. 2 which is an enlarged section taken along the lines 2—2 of Fig. 1. There may be seen one of the cylindrical sections 12a surrounding the rotor 3. In order to prevent distortion of the magnetic flux, the intermediate cylindrical segments 12a, 12b will preferably be constructed of non-magnetic material, for example of a suitable polyester resin and glass fiber composition. Due both to the centrifugal force and the difference in pressure on opposite sides of cylinder 12, the polyester-glass segments must be reasonably thick, perhaps on the order of one half inch. Since a polyester-glass cylinder cannot be shrunk onto the rotor, other means must be devised to secure segments 12a, 12b to the rotor 3. The method seen in Fig. 2 consists in supplying slot wedges 26, which retain the field windings against centrifugal force, with extending fingers 26a. The wedges are spring-loaded by resilient members 26b which will both provide for ease in assembly and to allow segment 12a to be assembled on the rotor 3. One such type of resilient member is disclosed in U.S. Patent 2,922,058, issued to Carl E. Bacon on January 19, 1960, and assigned to the assignee of the present application. The resilience of members 26b allows the wedges to be moved radially inward far enough to allow section 12a to be slid axially onto the rotor. Suitable sealing means, such as overlapping connections with appropriate caulking must be provided at the axial abutments between sections 12a, 12b.

An alternate method of attaching segments 12a, 12b to rotor 3 may be seen in Fig. 3. Insulating blocks 28, which are preferably of a non-magnetic material such as a suitable plastic laminate, are attached to the rotor 3. Blocks 28 are so proportioned that they form the outline of a distorted four-lobe figure as shown in Fig. 3. It will be appreciated, of course, that Fig. 3 has been greatly exaggerated in order to illustrate the four "lobes," since this departure from a true circular section would be barely perceptible to the eye in the actual rotor. The four-lobe pattern formed by support blocks 28 has four points 28a on the two major axes and four points 28b on the two minor axes. Section 12a is then distorted into an equivalent four-lobe pattern by a jig (not shown), and slipped axially over supporting blocks 28. Upon release, section 12a will attempt to assume a circular shape, thus causing it to be held more tightly at the four points 28a than at the minor axis points 28b. Upon increase in speed, centrifugal force will cause section 12a to attempt more vigorously to attain a true circular shape and it will grip points 28a even more tightly. Thus segment 12a is held firmly and prevented from becoming disengaged from rotor 3. The windage effect caused by the slight eccentricity of the rotor surface will be negligible.

It only remains to note that end sections 12c are preferably metallic for purposes of strength with support spacer portions 12d made integral with segment 12c and spaced at intervals around the circumference of 12c. Thus segment 12c may be shrunk to the retaining ring 3c.

The operation of my improved fluid cooled rotor is as follows. Compartment 21 is pressurized with a cooling gas, preferably air, by means of makeup pump 27 to a pressure, for example, of 150 p.s.i.g. Blower 8 will circulate the cooling gas through the field conductors by way of compartments 21, conduits 3b in the rotor and from compartment 24 under the retaining ring 3c, the gas will flow axially in the rotor internal cooling passages as shown by the arrows. The gas will exit near the center of the rotor by means of the holes 3a in the rotor surface to the space 13 between rotor 3 and cylinder 12 and will then flow axially exterior of the rotor body surface to compartments 22 at each end of the generator. From there it will be returned through conduits 9, past heat exchangers 11a to blower 8, and will be discharged again past heat exchangers 11b to compartment 21.

By means of the flow described, it will be seen that the entire cooling flow takes place so that none of the relatively high pressure rotor cooling gas is free to escape to the "clearance gap" 14 between the rotating cylinder 12 and the stationary stator core 2. The gas is returned longitudinally to the rotor ends in relatively large ducts rather than be required to traverse the equivalent of the full rotor length in the internal cooling passages of small cross-section. Rotating seal 17 will prevent the loss in pressure difference between compartments 21 and 22. Thus a reasonably high gas pressure and a commensurate high blower pressure may be utilized without large losses due to windage between the rotating and stationary members. Along with the increased capacity of the cooling gas for heat removal possible through the higher pressures employed, an increased cooling effect will be achieved which will consequently allow the ampere-turn rating of the rotor to be materially increased.

In order to still further increase the efficiency and to decrease the windage which would result from the gas at atmospheric pressure in gap 14, chamber 23 which opens into the gap 14 may be evacuated by means of steam ejector 25. This "scavenging" of gap 14 to a partial vacuum will virtually eliminate windage loss and will contribute to improved overall system efficiency.

Although there are many cooling gases which might be used with my improved rotor construction, air has many advantages both because makeup air can be furnished directly from the atmosphere by pump 27 and because the steam ejector 25 can scavenge air from compartment 23 and discharge it directly into the atmosphere without any deleterious effects. Also, leakage from the overall system through the rotating seals can be generally tolerated whereas with other fluids this might be hazardous or wasteful. It will be realized that many other flow patterns are possible other than the simple axial flow, center discharge pattern which has been described for simplicity. For example, reference to Fig. 2 will show that slot wedges 26 could sub-divide space 13 into alternate axial inlet and outlet zones, which in turn would service the direct-cooled conductors through radial passageways cut in the rotor body. More complicated flow paths would naturally result, although this arrangement would have the advantage of allowing the windings to be ventilated by more paths in parallel and result in a lower pressure and power demand from blower 8.

It will be appreciated that the use of my improved rotor will greatly increase flexibility in the choice of cooling fluids used. Since the rotor cooling gas is essentially contained within the rotor, it no longer need have a low density as with previous gas-cooled generators. Also, the use of self-contained rotor cooling system permits the "clearance gap" between the rotor and the stator to be evacuated and the windage losses consequently reduced to a negligible figure.

It is considered that my invention would be equally applicable where it is desired to use a liquid in lieu of a pressurized gas to cool the rotor. Although obviously modifications in design such as size and number of cooling passages, type of rotating seals, etc., would be necessary, the use of such equivalent structures would not constitute departure from the inventive concept here.

While there has been described what is at present considered to be the preferred embodiment of the invention, it will be understood that still other modifications may be made, and it is intended to cover by the appended claims all such modifications as fall within the true spirit and scope of the invention.

What I claim as new and desire to secure by Letters Patent of the United States is:

1. For use in a dynamoelectric machine having a stator core, a fluid-cooled rotor including conduit means for conducting a cooling fluid to remove heat generated therein, a cylindrical member disposed within and spaced radially inwardly from the stator core and enclosing and attached to the rotor so as to rotate therewith, means radially spacing the cylindrical member from the rotor peripheral surface to define a plurality of longitudinal cooling ducts between the rotor and the cylindrical member, and means to supply cooling fluid to the rotor cooling conduit means and to said longitudinal cooling ducts to cool the rotor.

2. In a dynamoelectric machine, the combination of a stator core, a rotor including internal passages for conducting a cooling fluid, cylindrical shield means secured around said rotor and spaced radially within the stator core to define an annular clearance gap between the shield means and the stator core, means radially spacing the cylindrical shield means from the rotor peripheral surface to define a plurality of longitudinal cooling ducts between the shield means and the rotor periphery, means to supply cooling fluid to said internal passages and said longitudinal cooling ducts to cool the rotor, and sealing means cooperating with one exterior of the cylindrical shield means at either end thereof to prevent said cooling fluid from entering said clearance gap.

3. In a dynamoelectric machine, the combination of a stator core enclosed by a fluid-tight housing, a rotor including internal passages for conducting a cooling fluid, cylindrical shield means secured around said rotor and spaced radially within the stator core to define an annular clearance gap between the shield means and the core, means radially spacing the cylindrical shield means from the rotor peripheral surface to define longitudinal cooling ducts therebetween, said cylindrical shield means extending through said fluid-tight housing at opposite ends thereof whereby the ends of the clearance gap communicate with the space inside the housing, rotating seal means to prevent leakage between said cylindrical shield means and the housing, means to supply cooling fluid to said internal passages to cool the rotor, and radial conduit means connecting the internal passages with the longitudinal cooling ducts, whereby said cooling fluid is discharged at the end of the cylindrical shield means.

4. In a dynamoelectric machine having a stator core, the combination of a rotor with current-carrying conductors, said conductors having internal passages for the flow of cooling fluid, cylinder means enclosing and attached to the rotor and spaced radially within the stator core to define an annular clearance gap, longitudinally disposed spacer means on the rotor to radially separate said cylinder means from the rotor to define longitudinal fluid cooling ducts, radially extending passages connecting said internal rotor cooling passages and said fluid cooling ducts, first conduit means to supply a flow of cooling fluid to said internal conductor passages, second conduit means to receive said fluid from the space within the cylinder means, heat exchanger means to cool the fluid, and pump means to re-circulate the fluid from the heat exchanger means to said first conduit means.

5. The combination according to claim 4 and including means to evacuate gas from the clearance gap between said cylinder means and the stator.

6. A cooled dynamoelectric machine rotor comprising a rotor body having first internal axial conduits therein for conducting a cooling fluid, fluid-tight cylinder means enclosing and attached to said rotor body so as to rotate therewith and separated radially therefrom so as to define second axial conduit means between the peripheral surface of the rotor body and the interior surface of the cylinder means for the flow of cooling fluid, third radial conduit means connecting said first and second conduits, and means to introduce cooling fluid under pressure at the ends of said rotor body and said cylinder means whereby cooling fluid will flow through said first, third, and second conduit means respectively to cool the rotor.

7. A pressurized rotor for a dynamoelectric machine comprising a cylindrical rotor body having current-carrying conductors with internal conduits for direct conductor cooling, cylinder means enclosing and attached to said rotor body so as to rotate therewith, spacer means disposed on said rotor body and spacing said cylinder means radially with respect to the rotor body to define longitudinal gas cooling ducts between the peripheral surface of the rotor body and the interior surface of the cylinder means, and means to circulate cooling gas through said internal conduits and said longitudinal cooling ducts while the rotor body and cylinder means are rotating, whereby a portion of the longitudinal travel of the cooling gas takes place in the internal conduits and a portion takes place in the longitudinal cooling ducts.

8. In a dynamoelectric machine the combination of a stator core, a fluid-tight housing enclosing said stator core, a rotor mounted for rotation within said stator core and having spindle portions extending through said fluid-tight housing in sealed relationship to prevent the leakage of gas, cylindrical shield means secured to the rotor and radially spaced within the stator to define an annular clearance gap for rotational clearance, said cylindrical shield means being radially spaced from the rotor to define longitudinal discharge passages, rotor conductors defining cooling passages and discharging into said longitudinal discharge passages, supply passages in a rotor spindle portion communicating with said conductor passages, a first housing wall having first rotating seal means cooperating with said cylindrical shield means to define a discharge collection chamber inside said housing for receiving spent coolant from the longitudinal discharge passages, a second housing wall with second rotating seal means cooperating with a rotor spindle portion to define a supply chamber inside said housing communicating with said supply passages in the rotor spindle portion, recirculating conduit means communicating between the discharge collection chamber and the supply chamber, heat exchanger means in said recirculating conduit means, first pump means for recirculating the coolant fluid, and second pump means for evacuating the stator housing.

9. In a dynamoelectric machine, the combination of a stator core, a rotor mounted for rotation within the stator core, cylindrical shield means secured to the rotor and spaced within the stator to define an annular clearance gap, said cylindrical shield means being radially spaced from the rotor to define longitudinal discharge passages, a fluid-tight housing enclosing said stator core and having the end portions of the cylindrical shield means projecting through the walls of said housing, rotating seal means to prevent the leakage of gas between the cylindrical shield means and the housing, and pump means to evacuate the housing and said clearance gap to minimize windage losses between the rotor and the stator.

10. In a dynamoelectric machine, the combination of a stator core, a rotor mounted for rotation within said stator core, cylindrical shield means secured to the rotor and spaced within the stator core to define an annular clearance gap, said cylindrical shield means being radially spaced from the rotor to define longitudinal discharge passages, a fluid-tight housing enclosing said stator core and having the end portions of the cylindrical shield means projecting through the walls of said housing, first rotating seal means to prevent the leakage of gas between the cylindrical shield means and the housing, pump means to evacuate the housing and said clearance gap to minimize windage losses between the rotor and the stator, rotor conductors defining cooling passages discharging into said longitudinal discharge passage within the cylindrical shield means, supply passages on at least one end of the rotor communicating with said conductor passages, coolant supply manifold means having second rotating seal means cooperating with said rotor and discharging into said supply passages, and a source of cooling gas under pressure communicating with said manifold means to cool the rotor.

References Cited in the file of this patent

UNITED STATES PATENTS

| | | |
|---|---|---|
| 686,856 | Davies | Nov. 19, 1901 |

FOREIGN PATENTS

| | | |
|---|---|---|
| 48,052 | Sweden | Dec. 8, 1920 |
| 844,933 | Germany | July 28, 1952 |

UNITED STATES PATENT OFFICE
CERTIFICATION OF CORRECTION

Patent No. 2,951,954                          September 6, 1960

David M. Willyoung

It is hereby certified that error appears in the above numbered patent requiring correction and that the said Letters Patent should read as corrected below.

In the heading to the printed specification, lines 2 and 3, title of invention, for "FLUID-COUPLED ROTOR FOR DYNAMO-ELECTRIC MACHINE" read -- FLUID-COOLED ROTOR FOR DYNAMO-ELECTRIC MACHINE --; column 8, line 32, for "passage" read -- passages --.

Signed and sealed this 25th day of April 1961.

(SEAL)
Attest:

ERNEST W. SWIDER
Attesting Officer

DAVID L. LADD
Commissioner of Patents